United States Patent [19]

Audureau et al.

[11] Patent Number: 4,861,834
[45] Date of Patent: Aug. 29, 1989

[54] COMPOSITIONS OF ETHYLENE POLYMERS, AND METHOD FOR THE PREPARATION THEREOF

[75] Inventors: Joel Audureau, Noeus les Mines; Edouard Piecuch, Beuvry les Bethune, both of France

[73] Assignee: Societe Chimique des Charbonnages S.A., France

[21] Appl. No.: 97,587

[22] PCT Filed: Dec. 19, 1986

[86] PCT No.: PCT/FR86/00438

§ 371 Date: Oct. 6, 1987

§ 102(e) Date: Oct. 6, 1987

[87] PCT Pub. No.: WO87/03888

PCT Pub. Date: Jul. 2, 1987

[30] Foreign Application Priority Data

Dec. 24, 1985 [FR] France ................ 85 19117

[51] Int. Cl.$^4$ .............. C08L 23/26; C08L 23/18; C08L 23/10; C08L 23/04

[52] U.S. Cl. .................... 525/194; 525/240; 525/197

[58] Field of Search ............ 525/240, 194, 74

[56] References Cited

U.S. PATENT DOCUMENTS

| 4,460,750 | 7/1984 | Thiersoult et al. | 525/33.8 |
|---|---|---|---|
| 4,486,579 | 12/1984 | Machon et al. | 526/65 |
| 4,535,125 | 8/1985 | McCullough, Jr. | 525/88 |
| 4,612,155 | 9/1986 | Wong et al. | 525/74 |
| 4,678,834 | 7/1987 | Bovin et al. | 525/194 |

FOREIGN PATENT DOCUMENTS

| 0069603 | 1/1983 | European Pat. Off. |
|---|---|---|
| 0083521 | 7/1983 | European Pat. Off. |
| 0161774 | 11/1985 | European Pat. Off. |
| 55-071738 | 5/1980 | Japan . |
| 58-210949 | 12/1983 | Japan . |
| 59-041342 | 3/1984 | Japan . |
| 59-202244 | 11/1984 | Japan . |
| 2152516 | 8/1985 | United Kingdom . |

Primary Examiner—Carman J. Seccuro
Attorney, Agent, or Firm—Finnegan, Henderson, Farabow, Garrett & Dunner

[57] ABSTRACT

The compositions contain:
(a) from 90 to 99.8% by weight of at least one modified polymer of ethylene and, where appropriate, at least one α-olefin having from 3 to 12 carbon atoms, the said polymer containing at least 80 mol % of units derived from ethylene, and
(b) from 0.2 to 10% by weight of at least one polymer phase (B) comprising at least one polymer containing at least 90 mol % of units derived from at least one α-olefin having from 3 to 12 carbon atoms, and at most 10 mol % of units derived from ethylene, the said compositions having a measured limiting viscosity of between 1.5 and 100 times their limiting viscosity calculated from the distribution of the molecular masses.

The process for preparing them consists in modifying a polymer (A) containing at least 80 mol % of units derived from ethylene and at most 20 mol % of units derived from at least one α-olefin having from 3 to 12 carbon atoms, by means of at least one free-radical initiator brought into contact with the said polymer (A) at a temperature above the melting point of the said polymer (A) for a time longer than or equal to one tenth of the half-life of the said initiator at the temperature in question, and is characterized in that the free-radical initiator, prior to being brought into contact with the polymer (A), is dispersed in at least one polymer phase (B) present in an amount such that its proportion in the resulting composition is between 0.2 and 10% by weight.

8 Claims, No Drawings

COMPOSITIONS OF ETHYLENE POLYMERS, AND METHOD FOR THE PREPARATION THEREOF

It is known to polymerize ethylene under very high pressure and at high temperature in the presence of a free-radical initiator. In this manner a polymer is obtained which is known by the name of free-radical low density polyethylene. Regardless of its melt flow index, this polymer generally exhibits acceptable stretchability during the preparation of tubular web and mediocre tear strength. On the other hand, it enables good stability of the bubble to be obtained during extrusion blowing and it possesses excellent processability; the processability is defined as, on the one hand, the absence of premature fracture of the extrudate ("melt fracture"), and on the other hand, the power consumed during the extrusion.

Substantial improvements to the stretchability and the tear strength have been brought about by preparing copolymers of ethylene and at least one α-olefin having from 3 to 12 carbon atoms, such as propylene and 1-butene, in the presence of a catalytic system of the Ziegler type. However, during their extrusion blowing, there is found to be some instability of the bubble, a spontaneous tendency for the holes to enlarge in cases where the bubble perforates, and a tendency to premature fracture of the extrudate.

Moreover, modified copolymers of ethylene and at least one α-olefin having from 3 to 12 carbon atoms, comprising from 0.5 to 10 mol% of units derived from the said α-olefin, are known from the document FR-A-2,519,007, these copolymers being characterized in that their measured limiting viscosity is between 1.5 and 10 times their limiting viscosity calculated from the distribution of the molecular weights. A process for preparing these modified copolymers consists in bringing the copolymer into contact with 0.01 to 1 millimole per kilogram of copolymer of at least one free-radical initiator at a temperature of 220° to 320° C. for a period of 5 to 200 seconds, in a processing machine such as an extruder.

The modified copolymers obtained by this process are completely soluble and extractable by the usual solvents for polyolefins, such as, in particular, trichlorobenzene and xylene. However, it has been found that the films prepared from these modified copolymers by extrusion blowing have slight defects which can only be detected by very sophisticated analytical means. Thus, study in polarized light shows up some surface defects due to the presence of gelled microparticles which it was impossible to detect by a simple test of solubility and extraction by the usual solvents. It has been found, moreover, that the use of amounts of free-radical initiators greater than 1 millimole per kilogram of copolymer leads to the presence of gels (that is to say, particles which are not extractable by the usual solvents), in an amount such that the modified copolymers obtained are either impossible to make use of by the technique of extrusion blowing or capable of being processed to films which possess defects which are incompatible with the use to which the films are put.

It has now been found possible to obtain modified polymers with improved properties, leading, in particular, to films not showing surface defects after study in polarized light, by bringing the polymer and the free-radical initiator into contact under the conditions of the present invention.

The subject of the present invention is compositions containing:

(a) from 90 to 99.8% by weight of at least one modified polymer of ethylene and, where appropriate, at least one α-olefin having from 3 to 12 carbon atoms, the said polymer containing at least 80 mol% of units derived from ethylene, and (b) from 0.2 to 10% by weight of at least one polymer phase comprising at least one polymer containing at least 90 mol% of units derived from at least one α-olefin having from 3 to 12 carbon atoms, and at most 10 mol% of units derived from ethylene, the said compositions having a measured limiting viscosity of between 1.5 and 100 times their limiting viscosity calculated from the distribution of the molecular weights Compared with the polymer from which it is derived, the modified polymer of ethylene has higher average molecular weight and viscosity, and a lower melt flow index.

The polymer which takes part in the formation of the polymer phase can be, in particular, polypropylene (especially isotactic polypropylene), poly(1-butene), poly(4-methyl-1-pentene), poly(1-decene), a copoly(propylene/ethylene), a copoly(1-butene/ethylene) or a copoly(propylene/1-butene/ethylene), these latter containing less than 10 mol% of units derived from ethylene, or else a copoly(propylene/1-butene).

Concepts of measured limiting viscosity $\eta_o^m$ and calculated limiting viscosity $\eta_o^c$ used here are those defined in the document FR-A-2,519,007.

The subject of the present invention is also a process for manufacturing the compositions described above, by modification of a polymer (A) containing at least 80 mol% of units derived from ethylene and at most 20 mol% of units derived from at least one α-olefin having from 3 to 12 carbon atoms, by means of at least one free-radical initiator brought into contact with the said polymer (A) at a temperature above the melting point of the said polymer (A) for a time longer than or equal to one tenth of the half-life of the said initiator at the temperature in question, characterized in that the free-radical initiator, prior to being brought into contact with the polymer (A), is dispersed in at least one polymer phase (B) comprising at least one polymer containing at least 90 mol% of units derived from at least one α-olefin having from 3 to 12 carbon atoms and at most 10 mol% of units derived from ethylene, the said phase (B) being present in an amount such that its proportion in the resulting composition is between 0.2 and 10% by weight.

The polymers (A) are well known and can be obtained by any known means which consist in polymerizing ethylene, or in copolymerizing ethylene with at least one α-olefin having from 3 to 12 carbon atoms, for example in the presence of a catalytic system of Ziegler type comprising at least one catalyst based on a transition metal of Groups IVB to VIB of the Periodic Classification and at least one activator comprising a hydride and/or an organometalic derivative of a metal of Groups IA to IIIA of the Periodic Classification. The (co)polymerization can thus be performed at a temperature of between 20° and 200° C., under a pressure of between 1 and 200 bars, in the gas phase (in a fluidized or agitated bed), in solution or in suspension in an inert liquid hydrocarbon having at least 6 carbon atoms. The (co)polymerization can also be performed at a temperature of between 160° C. and 350° C., under a pressure of between 200 and 2,500 bars, the residence time of the catalytic system in the polymerization reactor being between 2 and 100 seconds. The (co)polymerization can be performed in the presence of a transfer agent such as, for example, hydrogen, in a proportion ranging up to 2 mol%. The polymers (A) generally have a density of between 0.90 and 0.97.

Among the free-radical initiators which are suitable for carrying out the process according to the invention, there may be mentioned, in particular:

peroxy compounds such as, for example, peroxides, peresters, hydroperoxides, diazo compounds such as a 2,2'-azobis(acyloxyalkane), for example 2,2'-azobis(acetoxypropane) or 2,2'-azobis(2-acetoxy-4-methylpentane), or such as 1,1'-azobis(1-fromyloxycyclohexane), and hydrocarbons possessing labile carbon-carbon bonds such as, for example, diaryldialkylalkanes such as 2,3-diphenyl-2,3-dimethylbutane (commonly designated by the name biscumyl), or 3,4-diphenyl-3,4-dimethylhexane.

The dispersion of the initiator in the polymer phase is carried out by any known means, chosen in accordance with the physical state of the constituents and/or the device selected for bringing the dispersion of initiator into contact with the polymer (A). If it is necessary to heat the polymer phase (B), it is advantageous to work by kneading at a temperature such that the free-radical initiator does not decompose or suffers only slight deterioration. The dispersion obtained is then brought into contact with the polymer (A), advantageously in a polymer processing machine such as a kneader or a single-screw or twin-screw extruder.

The dispersion and the polymer can be brought into contact in a discontinuous process: the polymer (A), taking the form of a powder of particle size between 1 and 500 μm or granules, is then introduced into the processing machine simultaneously with the dispersion of initiator; the dispersion of initiator can also be homogenized beforehand with the polymer (A), for example by mixing powder or granules, the homogeneous mixture then being introduced into the processing machine.

The dispersion and the polymer can also be brought into contact in continuous fashion, witout the polymer (A) being isolated beforehand. The following procedure is then adopted: the main extruder, which receives the polymer contained in the low-pressure separator of a polymerization unit, is equipped with a lateral extruder fed with the dispersion of the initiator. The lateral extruder is heated and the dispersion is introduced into the main extruder, in which it mixes with the polymer (A). Either or both of these extruders are preferably of the twin-screw type. The lateral extruder can be replaced by a gear pump. The modified polymer which flows from the main extruder can then be shaped in the same manner as an unmodified polymer.

The polymer phase (B) advantageously contains from 0.02 to 10 parts by weight of the free-radical initiator for 100 parts by weight. The amount chosen depends on the degree of modification which it is desired to bring about on the said polymer (A), and the molecular weight of the initiator. The homogenization of greater amounts than 10 parts per 100 is, in effects, difficult to carry out.

Compared with the polymers from which they are derived, the modified polymers obtained according to the invention possess:

a very substantially reduced melt flow index $MFI_2$ (measured at 190° C. under 2.16 kg according to ASTM standard D 1238-73), a very substantially increased ratio of the melt flow indices (RMFI), which are measured according to the above standard at 21.6 kg and 2.16 kg, respectively, and an ease of use which is at least equal, despite the reduction in melt flow index $MFI_2$, and is improved in certain applications.

The process according to the invention enables modified polymers to be obtained which can be processed to films of thickness between 7 and 500 μm according to the usual techniques of extrusion blowing or extrusion by means of a slot die. The films thereby obtained show substantially increased impact resistance. They also have an excellent surface state, characterized, after study in polarized light, by the complete absence of the gelled microparticles. For this application, a polymer (A) having a melt flow index $MFI_2$ of between 0.5 and 10 dg/min is advantageously used. By the process according to the invention, the modified polymers acquire a melt flow index generally between 0.05 and 4 dg/min.

The process according to the invention also enables polymers having higher melt flow indices $MFI_2$, generally between 10 and 1,000 dg/min, to be modified. By the process according to the invention, the modified polymers acquire a melt flow index generally between 0.5 and 150 dg/min. The polymers thereby modified find advantageous application in the manufacture of articles moulded by injection. In this case, for identical density and melt flow index, the injectability (as defined below) of a modified polymer according to the invention is, surprisingly, superior to that of an unmodified polymer (A). In particular, and this is an additional advantage of the present invention, it is possible to reduce significantly the injection temperature for injecting the polymer at the same flow rate.

The object of the examples which follow is to illustrate the invention without implied limitation.

EXAMPLES 1 TO 16

The polymers below, designated $A_1$ to $A_6$, are ethylene/α-olefin copolymers whose main characteristics (nature and content of the α-olefin, density ρ, index $MFI_2$, ratio RMFI) are shown in Table I below. In this same table, there is shown the impact resistance IR, expressed in grams and measured (according to ASTM standard D 1709) on a film of thickness 50 μm obtained from the said polymer by extrusion blowing. The polymer $A_7$ is a homopolymer of ethylene.

TABLE I

| (A) | Constituent units in mol % | | | | ρ | $MFI_2$ | RMFI | IR |
|---|---|---|---|---|---|---|---|---|
| | $C_2H_4$ | $C_3H_6$ | $C_4H_8$ | $C_6H_{12}$ | | | | |
| $A_1$ | 96 | — | 4 | — | 0.918 | 0.8 | 26.4 | 170 |
| $A_2$ | 95.5 | — | 4.5 | — | 0.918 | 2.2 | 28 | 140 |
| $A_3$ | 98.25 | — | 1.75 | — | 0.934 | 1.4 | 24.1 | 88 |
| $A_4$ | 92.8 | 1.7 | 5.5 | — | 0.911 | 1.0 | 26 | 460 |
| $A_5$ | 95.7 | — | — | 4.3 | 0.931 | 0.9 | 25.7 | 170 |
| $A_6$ | 96.2 | — | 3.8 | — | 0.921 | 20 | * | ** |
| $A_7$ | 100 | — | — | — | 0.957 | 15 | * | ** |

*$MFI_{21.6}$ is not measurable for these products.
**not significant

As the polymer phase (B), the following are used:
an isotactic polypropylene marketed under the Trade Mark "NORSOPRYL FM 6020", hereinafter designated $B_1$, or a 1-butene/ethylene copolymer, comprising approximately 2 mol% of ethylene units, marketed under the Trade Mark "VITRON 1200 S", hereinafter designated $B_2$. The following free-radical initiators (I) are used:

2,2'-azobis(acetoxypropane), hereinafter designated $I_1$ (half-life: 1 min at 270° C., 1 h at 215° C.), 2,2'-azobis(2-acetoxy-4-methylpentane), hereinafter designated $I_2$ (half-life: 1 min at 260° C., 1 h at 179° C.), 1,1'-azobis(1-formyloxycyclohexane), hereinafter designated $I_3$ (half-life: 1 min at 260° C., 1 h at 189° C.), and 2,3-diphenyl-2,3-dimethylbutane (or biscumyl), hereinafter designated $I_4$ (half-life: 1 min at 300° C., 1 h at 230° C.).

The dispersions of free-radical initiators in the polymer phases were produced in a twin-screw kneader in the molten state, for a period of time less than one tenth of the half-life of the initiator (measured by differential thermal analysis in solution at 0.1% strength by weight in benzene) at the temperature selected for performing the dispersion. At the outlet of the extruder, the dispersion is converted to granules.

The compositions of these dispersions are shown in Table II below (the proportions are expressed in % by weight).

TABLE II

| Dispersion | Phase (B) $B_1$ | $B_2$ | Initiator $I_1$ | $I_2$ | $I_3$ | $I_4$ |
|---|---|---|---|---|---|---|
| $P_1$ | 99.5 | — | 0.5 | — | — | — |
| $P_2$ | 97.5 | — | 2.5 | — | — | — |
| $P_3$ | 98.7 | — | 1.3 | — | — | — |
| $P_4$ | — | 99.5 | 0.5 | — | — | — |
| $P_5$ | — | 97.5 | 2.5 | — | — | — |
| $P_6$ | — | 97.5 | — | 2.5 | — | — |
| $P_7$ | — | 97.5 | — | — | 2.5 | — |
| $P_8$ | 97.5 | — | — | — | — | 2.5 |

A mixture in the dry state of polymer (A) and of dispersion of initiator in the phase (B) is introduced at the main feed of a single-screw extruder. The ratio by weight (B)/(A), expressed as a percentage, is shown in Table III for each example. The temperature of the extruder (temperature at the material outflow point) is between 250° and 290° C. The contact time in the extruder is 240 s. The extruded modified polymer is then granulated.

The following are determined on these granules:

the limiting viscosity $\eta_o^m$ measured at 190° C. using the rheometric balance described in French Patent No. 1,462,343 and expressed in poises, the ratio $\eta_o^m/\eta_o^c$, the melt flow index $MFI_2$ expressed in dg/min and measured according to ASTM standard D 1238–73 under 2.16 kg, and the ratio of the melt flow indices (RMFI) under 21.6 kg and 2.16 kg. The values obtained are also shown in Table III.

The granules were processed by extrusion blowing to films 50 μm thick, on which the impact resistance (IR), expressed in grams in Table III, was measured according to ASTM standard D 1790–67.

TABLE III

| Example | (A) | Dispersion | (B)/(A) | $\eta_o^m$ | $\eta_o^m/\eta_o^c$ | $MFI_2$ | RMFI | IR |
|---|---|---|---|---|---|---|---|---|
| 1 | $A_1$ | $P_2$ | 1.5 | $3.5 \times 10^6$ | 35 | 0.1 | 100 | 340 |
| 2 | $A_1$ | $P_5$ | 1.5 | $4 \times 10^6$ | 40 | 0.1 | 100 | 310 |
| 3 | $A_4$ | $P_2$ | 1.5 | $>2.5 \times 10^6$ | >37 | 0.12 | 90 | 730 |
| 4 | $A_3$ | $P_2$ | 1.5 | $5.5 \times 10^6$ | 70 | 0.06 | 161 | 110 |
| 5 | $A_5$ | $P_2$ | 1.3 | $>2.5 \times 10^6$ | >42 | 0.1 | 102 | 230 |
| 6 | $A_2$ | $P_2$ | 1.5 | $2.5 \times 10^5$ | 8.5 | 0.58 | 48 | 220 |
| 7 | $A_2$ | $P_3$ | 3 | $2.5 \times 10^5$ | 8.5 | 0.54 | 51 | 300 |
| 8 | $A_1$ | $P_2$ | 0.25 | $3 \times 10^5$ | 4 | 0.4 | 39 | 200 |
| 9 | $A_1$ | $P_2$ | 0.5 | $5.1 \times 10^5$ | 4.6 | 0.2 | 60 | 260 |
| 10 | $A_1$ | $P_2$ | 0.85 | $2.5 \times 10^6$ | 31.5 | 0.16 | 73 | 310 |
| 11 | $A_1$ | $P_2$ | 1 | $>2.5 \times 10^6$ | >42 | 0.15 | 80 | 340 |
| 12 | $A_1$ | $P_4$ | 7.5 | $2.6 \times 10^6$ | 26 | 0.13 | 66 | 220 |
| 13 | $A_1$ | $P_3$ | 1.5 | $1 \times 10^6$ | 16 | 0.32 | 48 | 280 |
| 14 | $A_1$ | $P_6$ | 1.5 | $2 \times 10^6$ | 32 | 0.2 | 64 | 400 |
| 15 | $A_1$ | $P_8$ | 1.5 | $4.7 \times 10^5$ | 4.7 | 0.35 | 50 | 320 |
| 16 | $A_2$ | $P_2$ | 3 | $2.5 \times 10^6$ | 50 | 0.38 | 64 | 169 |

EXAMPLES 17 TO 20 (Comparative)

Compositions containing a polymer (A) and a phase (B), without a free-radical initiator, are produced by kneading in a single-screw extruder. Their respective proportions, expressed as % by weight, and the results of the measurements performed on the compositions obtained, are shown in Table IV.

TABLE IV

| Example | Polymer (A) | | Phase (B) | | $MFI_2$ | RMFI | IR |
|---|---|---|---|---|---|---|---|
| 17 | $A_2$ | 97.0 | $B_1$ | 3.0 | 2.15 | 25 | 80 |
| 18 | $A_1$ | 98.5 | $B_1$ | 1.5 | 1 | 26 | 204 |
| 19 | $A_1$ | 98.5 | $B_2$ | 1.5 | 1 | 26 | 161 |
| 20 | $A_1$ | 92.5 | $B_2$ | 7.5 | 0.9 | 33 | 155 |

EXAMPLES 21 TO 23

The polymer $A_6$, whose main characteristics are shown in Table I above, is used here, and this constitutes Comparative Example 21.

This polymer is modified, under the working conditions of Examples 1 to 16 above, by means of the dispersion $P_2$. The ratio by weight $(B_1)/(A_6)$, expressed as a percentage, is shown in Table V for each example. On the modified polymer, the following are measured:

the index $MFI_2$ and the ratio RMFI as defined above, the injectability INJ measured by adapting ASTM standard D-1329 as follows:

a horizontal press is used and the temperature of the spiral mould is 50° C. The injectability is the length (expressed in mm) of the spiral obtained after injection of material at 230° C.

the yield point stress in the longitudinal direction (YPS) measured according to ASTM standard D 638–80 and expressed in daN/cm², and the impact strength IMP expressed in joules at 23° C. and measured by means of a ROSAND PRECISION impactometer, with a falling mass of 10 kg at a velocity of 4.4 m/s on a sample 1.7 mm thick.

EXAMPLES 24 TO 26

A homopolymer of ethylene $A_7$, the main characteristics of which are shown in Table I above, is used, and this constitutes Comparative Example 24. This polymer is modified under the conditions described in Examples 1 to 16, using the dispersion $p_2$. The ratio by weight $(B_1)/(A_7)$, expressed as a percentage, is shown in Table V for each example. The index $MFI_2$ and the injectability INJ are measured on the modified polymers under the conditions stated in Examples 21 to 23.

The results obtained are shown in Table V.

TABLE V

| Example | (B)/(A) | $MFI_2$ | RMFI | INJ | YPS | IMP |
|---|---|---|---|---|---|---|
| 21 | 0 | 20 | | 600 | 80 | 2.3 |
| 22 | 3 | 3.8 | 167 | 500 | 100 | 3.1 |
| 23 | 8 | 0.8 | 57 | 425 | 160 | 4.5 |
| 24 | 0 | 15 | | 520 | | |
| 25 | 2 | 2.6 | 43 | 430 | | |
| 26 | 4 | 0.7 | 75 | 390 | | |

EXAMPLE 28

The coating of an aluminium film is carried out in continuous fashion under the following conditions. The polymer $A_6$, already described above, was modified under the conditions of Examples 1 to 16 by means of 5% by weight of dispersion $P_2$ (the modified polymer acquires a melt flow index $MFI_2$ of 6 dg/min), and then extruded and converted to film by means of a slot die. The temperature of the material at the outlet of the die is approximately 310° C. The film obtained is deposited in continuous fashion on a aluminium foil, which is unwound continuously from a reel at the rate of 100 m/min, in the proportion of approximately 35 g/m². The peel strength, measured according to ASTM standard D 903–49 (width of test specimen: 15 mm) is equal to 504 g.

EXAMPLE 29 (Comparative)

Under the same conditions as in Example 28, an aluminium film was coated with an ethylene polymer obtained by the free-radical method and having the same density and the same melt flow index.

The measured peel strength was 234 g.

We claim:

1. Process for manufacturing compositions by modification of a polymer (A) containing at least 80 mol% of units derived from ethylene and at most 20 mol% of units derived from at least one α-olefin having from 3 to 12 carbon atoms, by means of a modifying agent consisting at least one free-radical initiator brought into contact with said polymer (A), at a temperature above the melting point of said polymer (A) for a time longer than or equal to one tenth of the half-life of the initiator at a temperature above the melting point of said polymer (A), characterized in that the free-radical initiator, prior to being brought into contact with the polymer (A), is dispersed in at least one polymer phase (B) comprising at least one polymer containing at least 90 mol% of units derived from at least one α-olefin having from 3 to 12 carbon atoms and at most 10 mol% of units derived from ethylene, said phase (B) being present in an amount such that its proportion in the resulting composition is between 0.2 and 10% by weight.

2. Process according to claim 1, characterized in that the free-radical initiator and the polymer are brought into contact in a polynmer processing machine.

3. Process according to claims 1 and 2, characterized in that the polymer phase (B) contains from 0.02 to 10 parts by weight of the free-radical initiator for 100 parts by weight.

4. Process according to claims 1 to 3, characterized in that the free-radical initiator is chosen from peroxy compounds, diazo compounds and hydrocarbons possessing labile carbon-carbon bonds.

5. Process according to claim 4, characterized in that the diazo compound is a 2,2'-azobis(acyloxyalkane).

6. Compositions prepared by the process of claim 5 having a measured limiting viscosity of between 1.5 to 100 times their limiting viscosity calculated from the distribution of the molecular weights.

7. Compositions according to claim 6, characterized in that the polymer which takes part in the composition of the polymer phase is polypropylene.

8. Compositions according to claim 6, characterized in that the polymer which takes part in the composition of the polymer phase is a poly(1-butene/ethylene).

* * * * *

UNITED STATES PATENT AND TRADEMARK OFFICE
CERTIFICATE OF CORRECTION

PATENT NO.   : 4,861,834
DATED        : August 29, 1989
INVENTOR(S)  : Joel AUDUREAU et al.

It is certified that error appears in the above-identified patent and that said Letters Patent is hereby corrected as shown below:

Claim 2, column 8, line 26, change "polynmer" to --polymer--.

Claim 3, column 8, line 27, after "according to" insert --one of--.

Claim 4, column 8, line 31, after "according to" insert --one of--.

Claim 6, column 8, line 37, delete "claim 5" and insert --claim 1--.

Signed and Sealed this

Twenty-fifth Day of September, 1990

*Attest:*

HARRY F. MANBECK, JR.

*Attesting Officer*  *Commissioner of Patents and Trademarks*